United States Patent Office 3,415,801
Patented Dec. 10, 1968

3,415,801
THREE-COMPONENT MONOSUBSTITUTED ALUMINUM DIHALIDE CATALYSTS FOR OLEFIN POLYMERIZATION
Harry W. Coover, Jr., Kingsport, Tenn., assignor to Eastman Kodak Company, Rochester, N.Y., a corporation of New Jersey
No Drawing. Continuation of application Ser. No. 273,546, Apr. 17, 1963. This application Sept. 19, 1966, Ser. No. 580,503
15 Claims. (Cl. 260—93.7)

ABSTRACT OF THE DISCLOSURE

A novel catalyst for the polymerization of olefinic hydrocarbons to solid crystalline polymers which catalyst comprises a catalytic mixture containing an alkyl aluminum dihalide, an alkoxide of a transition metal and a component selected from the amides having the formulas:

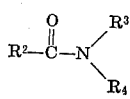

and     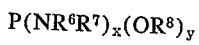

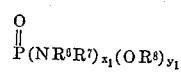

---

This application is a continuation of my copending application Ser. No. 273,546, filed Apr. 17, 1963, and now abandoned, which is a continuation-in-part of application Ser. No. 724,911, filed Mar. 31, 1958, and now U.S. Patent 3,088,942.

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high density using a particular catalyst combination which has unexpected catalytic activity and which gives products characterized by unusually high crystallinity, softening point, thermal stability, stiffness and being substantially free of noncrystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this same aluminum triethyl is used in conjunction with a titanium tetraalkoxide, such as titanium tetrabutoxide, the mixture does not produce solid polyethylene for some reason which is not apparent. A mixture of an alkyl aluminum dihalide and a titanium tetraalkoxide can be used to polymerize ethylene to form high density crystalline polymers, but when this catalyst is used to polymerize propylene and higher monoolefins high yields of polymeric oils and rubber are produced.

When a solid polyolefin of high density and high crystallinity is desired, a catalyst mixture that produces large quantities of oils and rubber is undesirable and in some instances commercially inadequate.

This invention is concerned with and has for an object the provision of improved processes whereby α-monoolefins and particularly polypropylene can be readily polymerized by catalytic means to give high molecular weight, highly crystalline polymers. A particular object of the invention is to provide an improved catalyst combination which has unexpected catalytic activity for the polymerization of α-monoolefins to form crystalline, high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum dihalide having the formula $R_1AlX_2$ wherein $R_1$ is selected from the group consisting of lower alkyl radicals containing from 1 to 12 carbon atoms, phenyl and benzyl and the halogen atoms are selected from the group consisting of chlorine, bromine and iodine, an alkoxide of a transition metal selected from the group consisting of titanium, zirconium, vanadium, chromium and molybdenum, and an amide third component. The amide can have the structural formula:

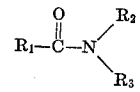

wherein $R_1$ is a radical selected from the group consisting of hydrogen, alkyl radicals containing from 1 to 20 carbon atoms, phenyl, carboxyl, —OR, —N(R)$_2$ wherein R is a radical containing 1 to 4 carbon atoms and

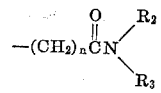

wherein $n$ is an integer of 1 to 4, and each of $R_2$ and $R_3$ is a radical selected from the group consisting of hydrogen, alkyl radicals containing 1 to 8 carbon atoms, phenyl and cyclohexyl.

The amide third component of the catalyst can have the structural formulas:

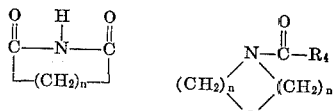

and

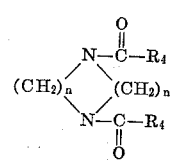

wherein $n$ is an integer of 1 to 4 and $R_4$ is a radical selected from the group consisting of alkyl radicals containing 1 to 4 carbon atoms and phenyl.

Other third components that can be employed in the catalyst are phosphorus-containing amides having the structural formulas:

$$P(NR_5R_6)_x(OR_7)_y$$

and $$\overset{O}{\underset{}{\|}}P(NR_5R_6)_{x_1}(OR_7)_{y_1}$$

wherein $x$ and $y$ are whole numbers from 1 to 3 and 0 to 2, respectively, the sum of $x$ and $y$ being 3, and $x_1$ and $y_1$ are whole numbers from 1 to 2, the sum of $x_1$ and $y_1$ being 3, and $R_5$, $R_6$ and $R_7$ are alkyl radicals containing 1 to 8 carbon atoms.

Amide third components that can be used in the catalyst system are

N,N-dimethylformamide,
N,N-dimethylacetamide,
N,N-diethylacetamide,
N-cyclohexylacetamide,
N-t-butylbenzamide,
N-methyl-N-phenylacetamide,
N-benzylacetamide,
n-heptamide,
palmitamide,
stearanilide,
acetanilide,
isobutyramide,
N,N'-di-t-butylurea,
tetramethylurea,
succinimide,
N,N,N',N'-tetramethyladipamide,
N-methylisobutyramide,
N-benzoylmorpholine,
N,N'-diacetylpiperazine,
n-butyloxamate,
ethyloxanilate,
ethyl carbamate,
diethyl N-dimethylamidophosphate,
ethyl N,N-tetraethyl amidophosphate,
diethyl N-dimethylamidophosphite,
ethyl N,N-tetraethyl diamidophosphite,
N,N,N-hexaethyl triamidophosphite,
dibutyl N-dipropyl amidophosphate,
n-pentyl N,N-tetrabutyl amidophosphate,
dipropyl N-dioctyl amidophosphite,
n-hexyl N,N-tetrabutyl diamidophosphite,
N,N,N-hexa(n-hexyl)triamidophosphite Catalyst mixtures that can be employed in practicing my invention are:

(a) Ethyl aluminum dichloride, titanium triethoxide and n-cyclohexylacetamide,
(b) Ethyl aluminum dibromide, titanium trimethoxide and N-methyl-N-phenylacetamide,
(c) Phenyl aluminum dichloride, zirconium tetrabutoxide and palmitamide,
(d) Butyl aluminum diiodide, zirconium tetrapentoxide and acetanilide,
(e) Cyclohexyl aluminum dichloride, vanadium triethoxide and isobutyramide,
(f) Tolyl aluminum dichloride, molybdenum pentabutoxide and N,N'-di-t-butylurea,
(g) Ethyl aluminum dichloride, titanium tetrapropoxide and ethyl carbamate,
(h) Octyl aluminum dibromide, titanium triethoxide and ethyl N,N-tetraethyl amidophosphate,
(i) Methyl aluminum diiodide, vanadium tributoxide and dimethyl N-dimethyl amidophosphate,
(j) Octyl aluminum dichloride, titanium triethoxide and N,N,N-hexamethyl triamidophosphite, and
(k) Ethyl aluminum dichloride, titanium tetrabutoxide and dimethyl N-dimethylamidophosphite.

The catalytic activity of this mixture was wholly unexpected, particularly since the monoalkyl aluminum dihalides when used alone are ineffective as polymerization catalyst and when combined with certain metal alkoxides produce large amounts of oils and rubbers in polymerizing propylene and higher monoolefins. The inventive process is carried out in liquid phase in an inert organic liquid and preferably an inert liquid hydrocarbon vehicle. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirable one which serves both as a liquid reaction medium and as a solvent for the solid polymerization products at the temperature of polymerization.

The invention is of particular importance in the preparation of highly crystalline polypropylene, the polybutenes and polystyrene, although it can be used for polymerizing ethylene, mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are partially soluble in such solvents as xylene, toluene, or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are particularly useful for polymerizing propylene to form a crystalline, high density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is an aluminum dihalide having the formula $R_1AlX_2$ wherein $R_1$ is a hydrocarbon radical containing 1 to 12 carbon atoms and selected from the group consisting of alkyl, aryl, and aralkyl. Among these hydrocarbon radicals are methyl, ethyl, propyl, butyl, phenyl, phenylethyl, naphthyl, and X is a halogen selected from the group consisting of chlorine, bromine and iodine. The preferred alkyl aluminum dihalides are the lower alkyl derivatives, and the most preferred is ethyl aluminum dichloride. Another component of the catalyst composition is an alkoxide of a transition metal selected from the group consisting of titanium, zirconium, vanadium, chromium and molybdenum. In these compounds the transition metal is preferably at its maximum valence, but a compound of a transition metal having a reduced valence can be used. For most desirable results it is preferred to use an alkoxide of titanium, for example, titanium ethoxide and titanium butoxide, and the titanium tetraalkoxides are usually used. It will be understood that the alkoxides of the other transition metals can be used if desired. The third component of the catalyst composition is an amide as described infra.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The molar ratio of aluminum dihalide to transition metal compound can be varied within the range of 1:0.5 to 1:2, and the molar ratio of aluminum compound to the third component of the catalytic mixture can be varied within the range of 1:1 to 1:0.25. A particularly effective catalyst contains one mole of transition metal compound and 0.5 mole of the third component per mole of aluminum compound, but it will be understood that higher and lower molar ratios are within the scope of invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other α-monoolefins in accordance with this invention is a mixture of ethyl aluminum dichloride, titanium tetrabutoxide and N,N-dimethylformamide. The importance of the various components of this reaction mixture is evident from the fact that a mixture of ethyl aluminum dichloride and titanium tetrabutoxide produces large amounts of oils and rubbers in a propylene polymerization. However, when the above phosphoramide or other third compound within the scope of this invention is added to the mixture the resulting catalyst composition is highly effective for polymerizing propylene to form a highly crystalline, high density, high softening polymer without the formation of oils and rubbers.

The invention is illustrated by the following examples of certain preferred embodiments thereof.

Example 1

In a nitrogen-filled dry box 2 grams of catalyst were added to a 500 ml. pressure bottle containing 100 ml. of dry heptane. The catalyst was made up of ethyl aluminum dibromide and titanium tetrabutoxide in a molar ratio of 1:1. The pressure bottle was then attached to a propylene source and the reaction mixture was agitated at 70° C. and under 30 p.s.i. of propylene pressure for 6 hours. No solid polypropylene and little, if any, liquid polymer was formed during this time indicating that under these conditions the catalyst mixture was ineffective for polymerizing propylene to form a solid, crystalline product.

Example 2

In a nitrogen-filled dry box a 500 ml. pressure bottle was loaded with 100 ml. of dry heptane and 2 grams of a catalyst made up of benzyl aluminum dibromide and zirconium tetrabutoxide in a 1:1 molar ratio. The pressure bottle was then attached to a propylene source and the reaction mixture was agitated at 70° C. and under 30 p.s.i. of propylene pressure for 6 hours. No solid propylene polymer was obtained. However, 60 grams of liquid, low molecular weight polymers were formed. Analysis by gas chromatography indicated that this product contained propylene dimers, trimers and tetramers.

Example 3

Inside a nitrogen-filled dry box the following materials were placed into a dry, 500 ml. pressure bottle: 100 ml. of dry heptane and 3 grams of a catalyst mixture which comprised a 1:1:0.25 molar ratio of ethyl aluminum dichloride, titanium triethoxide, and N,N-dimethylformamide. The pressure bottle was removed from the dry box, attached to a Parr hydrogenation apparatus in which propylene was being used in place of hydrogen, and shaking was initiated. The bottle and its contents were heated to 75° C. under 30 p.s.i. propylene pressure and maintained under these conditions for a total of 6 hours. The reaction vessel was detached then from the shaking apparatus, dry isobutyl alcohol was added to deactivate the catalyst, and then the polymer was washed with hot, dry isobutanol to remove the catalyst residues. A total of 9.8 grams of highly crystalline polypropylene was obtained having an inherent viscosity in tetralin at 145° C. of 1.95 and a density of 0.910.

When a control experiment was run, omitting the N,N-dimethylformamide, little or no solid polypropylene was formed under the above conditions.

A good yield of crystalline polypropylene was obtained when N,N-dimethylacetamide was used in place of the N,N-dimethylformamide in the above experiment or when vanadium triethoxide was used in place of the titanium triethoxide.

Example 4

Inside a nitrogen-filled dry box the following materials were placed into a 285 ml. stainless steel autoclave: 100 ml. of dry mineral spirits (B.P. 197° C.), a total of 2 grams of a 1:1:0.25 molar ratio of ethyl aluminum dichloride, titanium tetrabutoxide and N,N,N',N'-tetramethyladipamide. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hours. The polymer was worked up as described in Example 3 to give a yield of 13.0 grams of highly crystalline polypropylene having an inherent viscosity of 2.35 in tetralin at 145° C. When hydrogen was admitted to the polymerization vessel and was maintained there at 50 p.s.i. partial pressure, the inherent viscosity of the product was 1.80. An increase in the hydrogen pressure to 500 p.s.i. in a similar experiment produced a very low-molecular-weight crystalline polypropylene of inherent viscosity 0.36.

Example 5

The procedure of Example 4 was used to polymerize propylene with no solvent present. One hundred grams of propylene monomer was used and within the 6-hour polymerization period at 85° C., a 17.0 gram yield of highly crystalline polypropylene of inherent viscosity 2.95 was obtained.

Example 6

The procedure of Example 4 was employed to polymerize a 50 gram charge of 3-methyl-1-butene using 3 grams of catalyst made up of ethyl aluminum dibromide, titanium tetrabutoxide and ethyl N,N'-tetraethylamidophosphate in a molar ratio of 1:1:0.1. The yield was 12 grams of highly crystalline poly(3-methyl-1-butene) having an inherent viscosity of 1.15 and a crystalline melting point (oriented fiber) of 310° C.

N-acetylmorpholine could be substituted for the ethyl N,N'-tetraethylamidophosphate to give similar results.

Similar results were obtained also when the ethyl aluminum dibromide was replaced by either the corresponding dichloride or diiodide.

Example 7

The procedure of Example 4 was used to polymerize propylene using 1 gram of catalyst comprised of ethyl aluminum dichloride, vanadium tetrabutoxide and tetramethylurea in a 2:2:1 molar ratio. A 24 gram yield of crystalline polypropylene was obtained. This polymer had an inherent viscosity of 2.70 and a density of 0.909.

Example 8

The procedure of Example 4 was employed to polymerize allylbenzene using 2 grams of a catalyst comprised of ethyl aluminum dichloride, titanium tetrabutoxide and succinimide in a 1:2:1 molar ratio. The yield of crystalline poly(allylbenzene) was 25%.

Example 9

The procedure of Example 4 was employed to polymerize vinylcyclohexane using 2 grams of catalyst composed of a 2:2:1 molar ratio of ethyl aluminum dibromide, zirconium tetrabutoxide and n-heptamide. A 20% yield of highly crystalline poly(vinylcyclohexane) having an inherent viscosity of 1.05 was obtained.

Example 10

The procedure of Example 4 was employed to polymerize propylene using a 1:2:0.5 molar ratio of methylaluminum dichloride, titanium tetraisopropoxide and N-cyclohexylacetamide. From 50 grams of propylene monomer, a 37 gram yield of polypropylene of inherent viscosity 1.83 was obtained. Similar results were obtained when the methylaluminum dichloride was replaced with acetylaluminum dichloride.

Example 11

In a nitrogen-filled dry box, a 7 oz., tapered pressure bottle was charged in order with 40 ml. of dry benzene, 20 grams of 4-methyl-1-pentene and 1 gram of a catalyst consisting of ethyl aluminum dichloride, titanium tetrabutoxide and ethyl carbamate in a molar ratio of 3:1:2. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutantol and was dried. The crystalline poly(4-methyl-1-pentane) weighed 8.7 grams and melted at 235–240° C. (fiber). Good yields of crystalline poly(4-methyl-1-pentene) were also obtained when N-methyl-N-phenylacetamide or dimethyl N,N-dimethylamidophosphate was substituted for the ethyl carbamate above. Comparable results were also obtained when titanium tetrapentoxide was used in place of the titanium tetrabutoxide above.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst, it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecule weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols, such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

I claim:
1. In the polymerization of an olefinic hydrocarbon material to form solid crystalline polymer, the improvement which comprises catalyzing the polymerization with a catalytic mixture containing (1) an aluminum dihalide having the formula $R^1AlX_2$ wherein $R^1$ is a hydrocarbon radical containing 1 to 12 carbon atoms and selected from the group consisting of alkyl, aryl and aralkyl, and the halogen atoms being selected from the group consisting of chlorine, bromine and iodine, (2) an alkoxide of a transition metal selected from the group consisting of titanium, vanadium, zirconium, chromium and molybdenum; and (3) a component selected from the amides having the formulas:

(A) 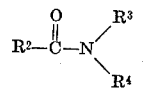

(B) $P(NR^6R^7)_x(OR^8)_y$ and (C) 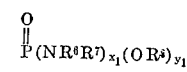

wherein $R^2$ is an alkyl radical containing 1 to 8 carbon atoms and

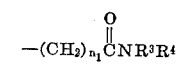

$n_1$ is an integer of 1 to 4, and wherein each of $R^3$ and $R^4$ is an alkyl radical containing 1 to 8 carbon atoms, and $R^6$ $R^7$, and $R^8$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ being 3.

2. The process according to claim 1 wherein the olefinic hydrocarbon material is at least one monoolefin selected from the group consisting of ethylene and propylene, $R^1$ represents a lower alkyl group, and (3) is selected from the amides having the Formula A.

3. A process according to claim 1 wherein the olefinic hydrocarbon material is at least one monoolefin selected from the group consisting of ethylene and propylene, R' represents a lower alkyl group, (2) is a titanium alkoxide and (3) is an amide having the Formula B.

4. A process according to claim 1 wherein the olefinic hydrocarbon material is at least one monoolefin selected from the group consisting of ethylene and propylene, R' represents a lower alkyl group, (2) is a titanium alkoxide and (3) is an amide having the Formula C.

5. The process according to claim 2 wherein the olefinic hydrocarbon is propylene and the polymerization is effected in liquid dispersion in an organic liquid and in the presence of a catalytic mixture of (1) ethyl aluminum dichloride, (2) titanium triethoxide, and (3) N,N-dimethylacetamide.

6. The process according to claim 2 wherein the olefinic hydrocarbon is propylene and the polymerization is effected in liquid dispersion in an organic liquid and in the presence of a catalytic mixture of (1) ethyl aluminum dichloride, (2) titanium tetrabutoxide, and (3) N,N,N', N'-tetramethyladipamide.

7. The process according to claim 4 wherein the olefinic hydrocarbon is propylene and the polymerization is effected in liquid dispersion in an organic liquid and in the presence of a catalytic mixture of (1) ethyl aluminum dichloride, (2) titanium tetrabutoxide, and (3) ethyl-N,N-tetraethyl amidophosphate.

8. As a composition of matter, a catalytic mixture containing (1) an aluminum dihalide having the formula $R^1AlX_2$ wherein $R^1$ is a hydrocarbon radical containing 1 to 12 carbon atoms and selected from the group consisting of chlorine, bromine and iodine, (2) an alkoxide of a transition metal selected from the group consisting of titanium, vanadium, zirconium, chromium and molybdenum, and (3) a component selected from the amides having the formulas:

(A) 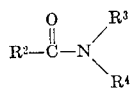

(B) $P(NR^6R^7)_x(OR^8)_y$ and (C) 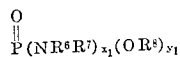

wherein $R^2$ is an alkyl radical containing 1 to 8 carbon atoms and

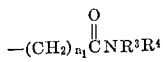

$n_1$ is an integer of 1 to 4, and wherein each of $R^3$ and $R^4$ is an alkyl radical containing 1 to 8 carbon atoms, and $R^6$, $R^7$, and $R^8$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3.

9. A composition of matter as in claim 8 wherein (1) is a lower alkyl aluminum dihalide and (3) is selected from the amides having the Formula A.

10. A composition of matter as in claim 9 wherein (2) is a titanium alkoxide.

11. A composition of matter as in claim 10 wherein (1) is ethyl aluminum dichloride, (2) is titanium triethoxide, and (3) is N,N,N',N'-tetramethyladipamide.

12. A composition of matter as in claim 10 wherein (1) is ethylaluminum dichloride, (2) is titanium tetrabutoxide, and (3) is N,N,N',N'-tetramethyladipamide.

13. A composition of matter as in claim 8 wherein (1) is a lower alkyl aluminum dihalide, (2) is a titanium alkoxide, and (3) is selected from the amides having the Formula B.

14. A composition of matter as in claim 8 wherein (1) is a lower alkyl aluminum dihalide, (2) is a titanium alkoxide, and (3) is selected from the amides having the Formula C.

15. A composition of matter as in claim 14 wherein (1) is ethyl aluminum dichloride, (2) is titanium tetrabutoxide, and (3) is ethyl-N,N-tetraethylamidophosphate.

References Cited

UNITED STATES PATENTS

| | | | |
|---|---|---|---|
| 3,147,240 | 9/1964 | Coover et al. | 260—93.7 |
| 3,230,208 | 1/1966 | Coover et al. | 260—93.7 |

FOREIGN PATENTS

| | | |
|---|---|---|
| 1,231,089 | 9/1960 | France. |
| 1,301,596 | 7/1962 | France. |

JOSEPH L. SCHOFER, *Primary Examiner.*

M. B. KURTZMAN, *Assistant Examiner.*

U.S. Cl. X.R.

252—431; 260—93.5, 94.9, 88.2, 94.3